Dec. 13, 1960 K. E. WALKER 2,964,589

APPARATUS FOR CONTROLLING SIGNAL TRANSFER IN A COLOR TELEVISION SYSTEM

Filed March 10, 1958 2 Sheets-Sheet 1

INVENTOR.
KENNETH E. WALKER
BY
Fordyce A. Bothwell
ATTORNEY

Dec. 13, 1960
K. E. WALKER
APPARATUS FOR CONTROLLING SIGNAL TRANSFER
IN A COLOR TELEVISION SYSTEM
2,964,589
Filed March 10, 1958
2 Sheets-Sheet 2

INVENTOR.
KENNETH E. WALKER
BY
Fordyce A. Bothwell
ATTORNEY

United States Patent Office 2,964,589

Patented Dec. 13, 1960

2,964,589

APPARATUS FOR CONTROLLING SIGNAL TRANSFER IN A COLOR TELEVISION SYSTEM

Kenneth E. Walker, Beverly, N.J., assignor to Philco Corporation, Philadelphia, Pa., a corporation of Pennsylvania Filed Mar. 10, 1958, Ser. No. 720,098

11 Claims. (Cl. 178—5.4)

This invention relates to color television systems and more particularly to the control of transfer of a composite color television signal which represents different primary colors successively and repetitively at a picture element rate.

In some systems involving transmission of an intelligence signal, it is desirable and necessary at times to effect gradual variation of the transfer of the signal at the transmitter end of the system by controlling the gain of an amplifier in the signal channel. For example, in the case of a monochrome (black and white) television system, the monochrome television signal from the camera may be supplied to a controllable vacuum tube amplifier and the signal transfer may be varied by varying the gain of the amplifier. However, it is characteristic of any amplifier stage whose gain is varied that phase distortions are introduced into the signal. In the case of a television signal, the controllable amplifier is required to handle a wide band signal and it is inevitable that phase distortion will be introduced into the signal when the gain of the amplifier is varied.

In a monochrome television system, this is relatively unimportant because the video signal simply varies in amplitude according to the variations in light intensity along each scanned line of the object or scene being televised, and any phase distortion introduced in the manner above mentioned merely causes unnoticeable error in the reproduced monochrome image. Consequently, in a monochrome television system the above-mentioned control of signal transfer does not present any problem.

However, when it is attempted to control the transfer of the now-standard composite color television signal, a serious problem is presented with respect to color error caused by phase variations in the signal. This is due to the fact that the instantaneous phase of the signal represents picture information. Thus in a color television system according to present standards, the component color signals from a color camera are encoded into a composite signal whose phase is representative of hue and whose amplitude is representative of saturation, and for each elemental area of the televised object or scene the signal successively represents different primary colors of that area, such as red, green and blue. Even a slight variation in phase of the composite color signal will cause it to be misrepresentative of hue and will cause conspicuous color error in the reproduced color image.

The principal object of the present invention is to provide a solution of this problem.

This invention is based on the concept that the transfer of a composite color television signal may be controlled without causing noticeable color error by simultaneously and identically controlling the transfer of component color signals prior to their being brought together to form the composite color signal. Thus, in accordance with this invention, the individual simultaneous component color signals from a color television camera may be controlled simultaneously and identically prior to their being encoded into the composite color signal. Since each of the unencoded component color signals simply varies in amplitude according to saturation of a particular primary color in the televised object or scene, any slight variation in phase of the unencoded signals does not produce noticeable color error in the reproduced color image.

The present invention is particularly applicable to the production of effects such as fading, montage, and video keying, which are well known to those skilled in the art. The term "fading" designates gradual variation in intensity of the picture as a whole, either from full intensity to black or from black to full intensity. The term "montage" designates the replacement of an area of a picture with an area of another picture, either on a stationary basis or as a "wipe" removing one picture as the other is inserted. The term "video keying" refers to insert control by the use of a video signal as the controlling medium.

The above-mentioned effects are readily produced without noticeable picture error in a monochrome television system. Of particular interest as background for the present invention is the monochrome system disclosed in U.S. Patent No. 2,240,420, issued April 29, 1941, to B. E. Schnitzer, which enables montage according to any one of a variety of predetermined patterns. In such a system, a triangular or sawtooth wave is produced, and portions or "slices" of the wave at different levels are removed and are used to produce the montage effects. The frequency of said wave may be either the line frequency or the frame frequency, depending upon the specific effect which it is desired to produce.

With the advent of color television, the production of such effects as aforementioned presented a serious problem for the reasons already mentioned. The present invention, however, solved the problem and enabled production of such effects in a color television system without causing noticeable color error in the reproduced image.

A further object of this invention, therefore, is to provide a system having such capability.

Other objects of the invention will be apparent from the following detailed description.

Reference is now made to the accompanying drawings, wherein

Figure 1:
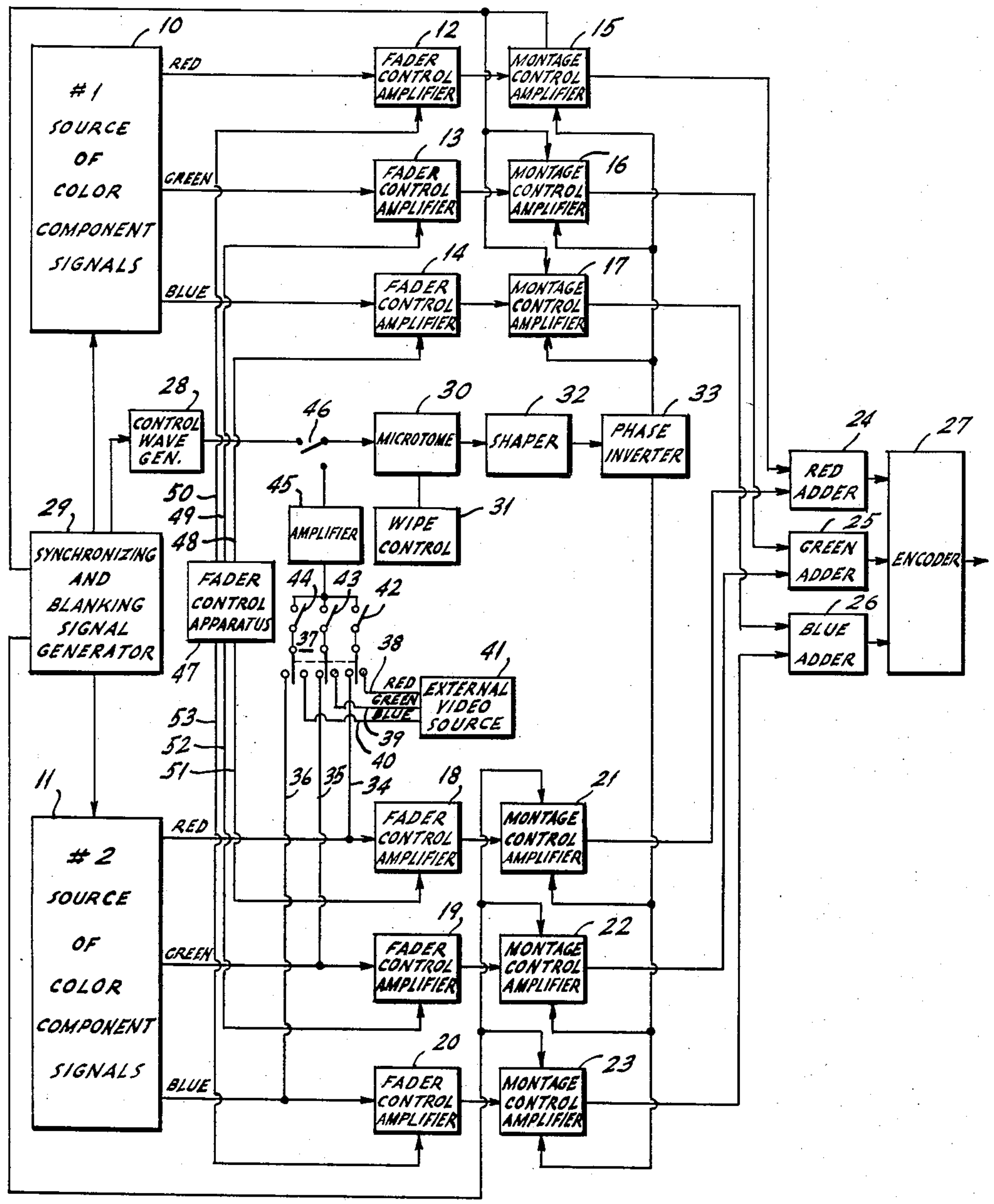
Fig. 1 is a block diagram of a system embodying this invention.

Referring first to Fig. 1, two sources of component color signals are represented at 10 and 11, each of which may be a conventional color television camera. It is assumed that the two cameras are trained on two different scenes, so that they produce simultaneous component color signals representative of three primary colors present in the two scenes, e.g. red, green and blue. The component color signals from source 10 are passed through identical fader control amplifiers 12, 13 and 14 and through identical montage control amplifiers 15, 16 and 17. Similarly, the component color signals from source 11 are passed through identical fader control amplifiers 18, 19 and 20 and through identical montage control amplifiers 21, 22 and 23. The red component signals from amplifiers 15 and 21 are supplied to the red adder 24; the green component signals from amplifiers 16 and 22 are supplied to the green adder 25; and the blue component signals from amplifiers 17 and 23 are supplied to the blue adder 26. The component color signal outputs of adders 24, 25 and 26 are supplied to a conventional encoder 27 which produces the composite color signal.

As in the system disclosed in the aforementioned Schnitzer patent, a control wave generator 28 is provided, which may be a triangular wave generator of a sawtooth wave generator. The control wave generator is supplied with pulses from the synchronizing and blanking signal generator 29, for example the horizontal blanking pulses. The wave produced by the generator 28 is supplied to a "microtome" 30 which, as described in the Schnitzer patent, removes portions of the wave at different levels according to the operation of the wipe control 31 which corresponds to the "fading control" in the Schnitzer patent. The removed portions of the wave are shaped in shaper 32 and are supplied to a phase inverter 33 which supplies oppositely phased signals, one to the amplifiers 15, 16 and 17 and the other to the amplifiers 21, 22 and 23.

As thus far described, the system is operable to produce montage effects according to any one of a variety of predetermined patterns as in the system disclosed in the Schnitzer patent. However, in the present color television system, the component color signals in the channels extending from each of the two color television cameras are controlled simultaneously and identically, and after such control the corresponding component color signals are added and the resultant signals are encoded to produce the composite color signal. In this manner the present system enables production of montage effects without causing noticeable color degradation in the reproduced color image.

The present invention further provides for the production of montage effects by video keying. In the system illustrated, the video keying signal may be derived from one or more of the color component signal channels extending from one of the color television cameras, or it may be supplied from an external video source. In any case, the video keying signal is supplied to the microtome 30 in place of the signal from the wave generator 28, and the microtome removes portions of the keying signal at different levels according to the operation of the wipe control 31.

Thus, in the illustrated system, connections 34, 35 and 36 extend from the red, green and blue channels respectively of color camera #2 to a triple-pole double-throw switch 37. Connections 38, 39 and 40 extend to the same switch from an external video source 41 which supplies red, green and blue signals. Switch 37 is connected to switches 42, 43 and 44 which are connected to the input of an amplifier 45. The latter in turn is connected to a double throw switch 46.

In the illustration, the upper position of switch 46 is the position for utilizing the keying signal from generator 28. By actuating switch 46 to its other position, the system is adapted for video keying. Then switch 37 may be actuated to either position to utilize for the video keying either the color signals from color camera #2 or the color signals from the external video source 41. In either case, switches 42, 43 and 44 enable the use of one or more color signals for keying, according to whether one color signal alone makes a superior keying signal or whether a selected pair or all three in combination make a superior keying signal.

With this arrangement, the selectable keying signals may be derived from three picture sources. Thus, source 41 could comprise three cameras looking at three separate and distinct scenes (slides) selectable at will by the operator to produce the keying signal.

The present invention further provides for fading control independently of the montage control. To this end, the fader control apparatus 47 is provided by which simultaneous identical control of the gain of amplifiers 12 to 14, and simultaneous identical inverse control of the gain of amplifiers 18 to 20, is effected over connections 48 to 53. By means of the fader control operation, the color picture represented by the output signals of one color camera may be faded out while the color picture represented by the output signals of the other color camera may be faded in, without causing color degradation of the pictures. As hereinafter described, the fader control apparatus also enables achivement of the necessary tracking of the three channels from each color camera to maintain the white balance of the tricolor signals.

In addition to the aforementioned effects, the present invention enables the production of other effects such as now to be described. Suppose, for example, that camera #1 views a scene (live, film or slide) and that camera #2 views a title, e.g. white on black background. Then the title can be keyed onto the scence in various colors. Thus if two of the channels from camera #2 are cut off by reducing the gain of two of the fader control amplifiers to zero, the black in the title will appear black but the white will appear in shades of one of the primary colors (red, green and blue) depending upon which channel is operative. If only one of the channels is cut off, the white in the title will appear in shades of a complementary color (yellow, cyan or magenta) depending upon which channels are operative. Thus the operator can cause the white information of the title to appear in shades of any selected primary color or in shades of any selected complementary color.

Another possibility is that source #2 may be a monochrome camera supplying the same signal to the three channels extending therefrom. Then the title will appear as it actually is, i.e. white on black.

It will also be seen that by using only one color camera, a black-and-white scene can be reproduced in shades of a selectable color.

For example, in the illustrated system suppose that only the #2 camera is used and is caused to scan a black and white scene, and suppose that two of the channels are cut off by reducing the gain of two of the fader control amplifiers to zero. Then the black information will appear black, and the white and gray information will appear in shades of one of the primary colors (red, green or blue), depending upon which channel is operative. If only one of the channels is cut off, the white and gray information will appear in shades of a complementary color (yellow, cyan or magenta). Thus the operator can cause the white and gray information of the black and white scene to appear in shades of any selected primary color or in shades of any selected complementary color.

From the foregoing it will be apparent that a system according to this invention is extremely versatile. Those skilled in the art will realize that with such a system it is possible to achieve effects even beyond those described above.

It will be apparent that the various components of the system shown in Fig. 1 may be of known or conventional form. The components which correspond to those shown in the aforementioned Schnitzer patent may be of the form shown therein. As to the fader control amplifiers and the fader control apparatus, these are preferably of the form shown in Fig. 2. The other components may be of conventional form.

Figure 2:
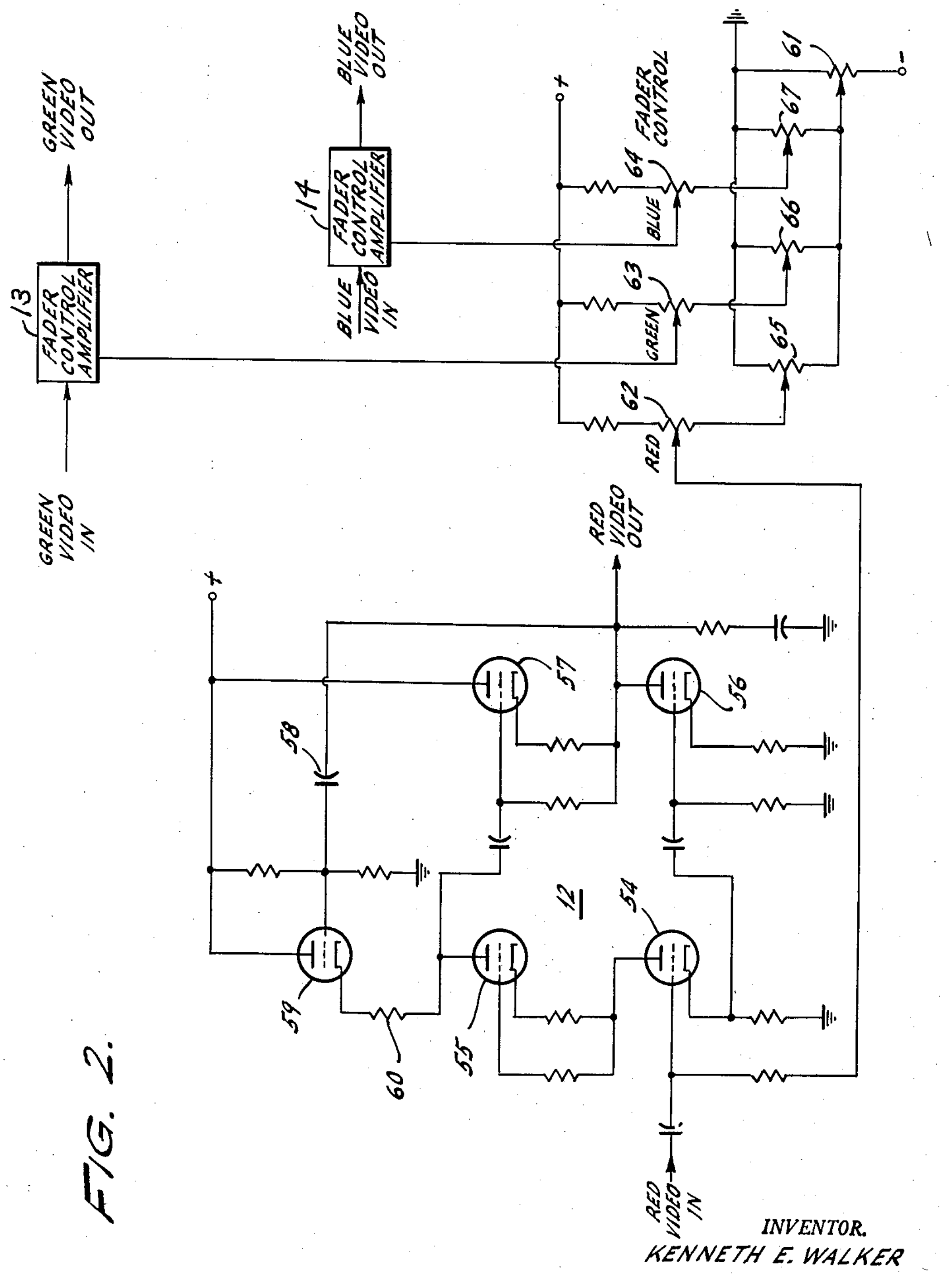
Fig. 2 is a diagrammatic illustration of one form of fader control amplifier and fader control apparatus which may be employed in the system of Fig. 1.

Referring now to Fig. 2, the fader control amplifier 12 is shown by way of specific example in schematic form, it being understood that the other fader control amplifiers are of the same form. In this amplifier arrangement, tubes 54 and 55 form a cascode amplifier, and tubes 56 and 57 form a single ended push-pull amplifier. In order to assure equal but opposite phase input signals for tubes 56 and 57, a feedback connection including a capacitor 58 extends to the grid of tube 59 whose cathode is connected to the upper end of resistor 60. The circuit is not sensitive to changes in tube characteristics within normal limits.

The fader control comprises a main control potentiometer 61 and trimmer control potentiometers 62 to 67. By proper adjustment of the trimmer control potentiometers, it is easily possible to achieve the necessary tracking of the three channels to maintain the white balance of the tricolor signals.

It will be understood that the fader control amplifiers 18 to 20 and the associated fader control may be of the same character as illustrated in Fig. 2.

While the invention has been described herein with reference to the embodiment shown in Fig. 1, it is not limited thereto but contemplates such modifications and further embodiments as may occur to those skilled in the art. Moreover, it will be understood that the invention is not limited to a system for the production of montage effects and the fading out and in of two pictures, but is applicable to the control of signal transfer in a system employing a single color camera and associated channels.

I claim:

1. In a color television system, means for producing simultaneously a plurality of signals representative respectively of different primary colors of a scanned object or scene, a plurality of signal channels corresponding in number to said signals, means for supplying said signals respectively to said signal channels, means for encoding the outputs of said channels into a composite color television signal which represents said different colors in succession at a picture element rate, the instantaneous phase of said composite signal being representative of hue, and means for enabling manual control of the transfer of said composite signal without causing hue error due to inevitable phase shift accompanying the control operation, said last means comprising identical controllable-gain amplifiers in said respective signal channels, and means including a manually-adjustable device common to said amplifiers for varying the gain of said amplifiers simultaneously and to the same extent thereby to vary identically the transfer of the signals representative of different colors prior to the encoding of the signals into the composite signal, whereby phase shift incident to the variation of transfer of said color-representative signals does not produce any error of hue in the composite signal but simply produces inappreciable error of saturation in the composite signal.

2. In a color television system, a first camera means for producing simultaneously a first plurality of signals representative respectively of different primary colors of a scanned object or scene, a first plurality of signal channels connected to said camera means to receive respectively said signals, a second camera means for producing simultaneously a second plurality of signals representative respectively of different primary colors of a scanned object or scene, a second plurality of signal channels connected to said second camera means to receive respectively said second signals, adders connected to said channels for adding the signals representative of the same color, means for encoding the outputs of said adders into a composite color television signal which represents said different colors in succession at a picture element rate, the instantaneous phase of said composite signal being representative of hue, and means for varying inversely the contents of said composite signal derived from said first and second camera means without causing hue error due to inevitable phase shift accompanying such variation, said last means comprising identical first controllable gain amplifiers in said first channels, identical second controllable-gain amplifiers in said second channels, means for varying the gain of said first amplifiers simultaneously and to the same extent thereby to vary identically the transfer of said first signals prior to encoding thereof, and means for inversely varying the gain of said second amplifiers simultaneously and to the same extent thereby to vary identically the transfer of said second signals prior to encoding thereof, whereby any phase shift incident to the variation of transfer of said color-representative signals does not produce any error of hue in said composite signal but simply produces inappreciable error of saturation in the composite signal.

3. In a color television system, a first camera means for producing simultaneously a first plurality of signals representative respectively of different primary colors of a scanned object or scene, a first plurality of signal channels connected to said camera means to receive respectively said signals, first identical montage control amplifiers in the respective signal channels, a second camera means for producing simultaneously a second plurality of signals representative respectively of different primary colors of a scanned object or scene, a second plurality of signal channels connected to said second camera means to receive respectively said second signals, second identical montage control amplifiers in the respective last-named signal channels, means for effecting simultaneous identical variation of the gain of said first montage control amplifiers and simultaneous identical inverse variation of the gain of said second montage control amplifiers, adders connected to said channels for adding the signals representative of the same color, and encoder means connected to said adders to form a composite color television signal whose phase is representative of hue and whose amplitude is representative of saturation.

4. In a color television system, a first camera means for producing simultaneously a first plurality of signals representative respectively of different primary colors of a scanned object or scene, a first plurality of signal channels connected to said camera means to receive respectively said signals, first identical montage control amplifiers in the respective signal channels, a second camera means for producing simultaneously a second plurality of signals representative respectively of different primary colors of a scanned object or scene, a second plurality of signal channels connected to said second camera means to receive respectively said second signals, second identical montage control amplifiers in the respective last-named signal channels, a phase inverter having a single input and two outputs for producing two output signals of opposite phase in response to an input signal, means connecting the outputs of said inverter respectively to the montage control amplifiers in the first and second plurality of signal channels, thereby to control the signal transfer by the montage control amplifiers, means for supplying a control signal to the input of said inverter to produce montage effects, adders connected to said channels for adding the signals representative of the same color, and encoder means connected to said adders to form a composite color television signal whose phase is representative of hue and whose amplitude is representative of saturation.

5. A color television system according to claim 4 including a synchronizing and blanking signal generator, wherein the means for supplying a control signal comprises a control wave generator connected to the first-mentioned generator, means for selecting portions of the control wave output of the last-mentioned generator at different levels, and means for supplying said portions to the input of said phase inverter.

6. A color television system according to claim 4, wherein the means for supplying a control signal comprises means for supplying a video signal, means for selecting portions of said video signal at different levels, and means for supplying said portions to the input of said phase inverter.

7. A color television system according to claim 6, wherein the means for supplying a video signal comprises connections and switches for deriving a video signal from any of the channels connected to one of said camera means.

8. A color television system according to claim 6, wherein the means for supplying a video signal includes an external video source.

9. In a color television system, a first camera means for producing simultaneously a first plurality of signals representative respectively of different primary colors of a scanned object or scene, a first plurality of signal channels connected to said camera means to receive respectively said signals, first identical fading control amplifiers in the respective signal channels, a second camera means for producing simultaneously a second plurality of signals representative respectively of different primary colors of a scanned object or scene, a second plurality of signal channels connected to said second camera means to receive respectively said second signals, second identical fading control amplifiers in the respective second signal channels, means for effecting simultaneous identical variation of the gain of said first fading control amplifiers and simultaneous identical inverse variation of the gain of said second fading control amplifiers, adders connected to said channels for adding the signals representative of the same color, and encoder means connected to said adders to form a composite color television signal whose phase is representative of hue and whose amplitude is representative of saturation.

10. In a color television system, a first camera means for producing simultaneously a first plurality of signals representative respectively of different primary colors of a scanned object or scene, a first plurality of signal channels connected to said camera means to receive respectively said signals, first identical fading control amplifiers in the respective signal channels, first identical montage control amplifiers in the respective signal channels, a second camera means for producing simultaneously a second plurality of signals representative respectively of different primary colors of a scanned object or scene, a second plurality of signal channels connected to said second camera means to receive respectively said second signals, second identical fading control amplifiers in the respective second signal channels, second identical montage control amplifiers in the respective second signal channels, means for effecting simultaneous identical variation of the gain of said first fading control amplifiers and simultaneous identical inverse variation of the gain of said second fading control amplifiers, means for effecting simultaneous identical variation of the gain of said first montage control amplifiers and simultaneous identical inverse variation of the gain of said second montage control amplifiers, adders connected to said channels for adding the signals representative of the same color, and encoder means connected to said adders to form a composite color television signal whose phase is representative of hue and whose amplitude is representative of saturation.

11. In a color television system, means for producing simultaneously a plurality of signals representative respectively of different primary colors of a scanned object or scene, a plurality of signal channels corresponding in number to said signals, means for supplying said signals respectively to said signal channels, means for encoding the outputs of said channels into a composite color television signal which represents said different colors in succession at a picture element rate, the instantaneous phase of said composite signal being representative of hue, identical controllable-gain amplifiers in said respective channels, means including a manually-adjustable control device common to said amplifiers for varying the gain of said amplifiers simultaneously and to the same extent thereby to vary identically the transfer of the signals representative of different colors prior to the encoding of the signals into the composite signal, whereby phase shift incident to the variation of transfer of said color-representative signals does not produce any error of hue in the composite signal but simply produces inappreciable error of saturation in the composite signal, and means including manually-adjustable devices individual to said respective amplifiers for the achievement of tracking of said channels to maintain the white balance of said color-representative signals.

References Cited in the file of this patent

UNITED STATES PATENTS

| | | |
|---|---|---|
| 2,509,038 | Goldsmith | May 23, 1950 |
| 2,660,613 | Young | Nov. 24, 1953 |
| 2,808,455 | Moore | Oct. 1, 1957 |